United States Patent
Sakino et al.

(10) Patent No.: US 9,823,944 B2
(45) Date of Patent: Nov. 21, 2017

(54) DEPLOYMENT CONTROL DEVICE AND DEPLOYMENT CONTROL METHOD FOR DEPLOYING VIRTUAL MACHINE FOR ALLOWING ACCESS

(71) Applicant: FUJITSU LIMITED, Kawasaki-shi, Kanagawa (JP)

(72) Inventors: Shinya Sakino, Numadu (JP); Mitsuo Ando, Numadu (JP); Takenori Nagasawa, Mishima (JP); Naoki Gunji, Numadu (JP); Toshinori Takehira, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 14/919,194

(22) Filed: Oct. 21, 2015

(65) Prior Publication Data
US 2016/0132348 A1    May 12, 2016

(30) Foreign Application Priority Data
Nov. 12, 2014 (JP) ................................ 2014-230229

(51) Int. Cl.
G06F 9/455 (2006.01)
G06F 9/445 (2006.01)
G06F 7/04 (2006.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| 2009/0328030 A1* | 12/2009 | Fries | G06F 8/63 717/174 |
| 2011/0162087 A1* | 6/2011 | Lal | G06F 9/45533 726/29 |
| 2013/0185772 A1* | 7/2013 | Jaudon | H04L 67/08 726/4 |
| 2015/0020069 A1* | 1/2015 | Patani | G06F 9/45558 718/1 |

FOREIGN PATENT DOCUMENTS

| JP | 2004-32523 | 1/2004 |
| JP | 2005-4412 | 1/2005 |
| JP | 2007-129534 | 5/2007 |

* cited by examiner

*Primary Examiner* — Bing Zhao
(74) *Attorney, Agent, or Firm* — Staas & Halsey LLP

(57) ABSTRACT

A deployment control device includes a processor. The processor is configured to receive, from a first terminal device, a deployment request for requesting deployment of a virtual machine. The processor is configured to generate, in response to the received deployment request, the virtual machine configured to hold first permission information corresponding to unique information of the first terminal device, and selectively allow an access from a terminal device having permission information identical to the first permission information. The processor is configured to transmit the first permission information to the first terminal device.

5 Claims, 18 Drawing Sheets

FIG.3

| M_NUM | MAC ADDRESS | LICENSE MANAGEMENT INFORMATION | | | LICENSE CONTENT | | |
|---|---|---|---|---|---|---|---|
| | | | D_MAC | D_IP | S_MAC | P_NUM | P_VEC |
| 1 | 00:99:00:00:00:00 | LICENSE A | D_MAC | D_IP | Access.1 | | |
| | | | | | S_MAC | P_NUM | P_VEC |
| 2 | 00:99:00:00:00:00 | LICENSE X | D_MAC | D_IP | Access.1 | | |
| | | | | | S_MAC | P_NUM | P_VEC |
| | | | | | Access.2 | | |
| | | | | | S_MAC | P_NUM | P_VEC |

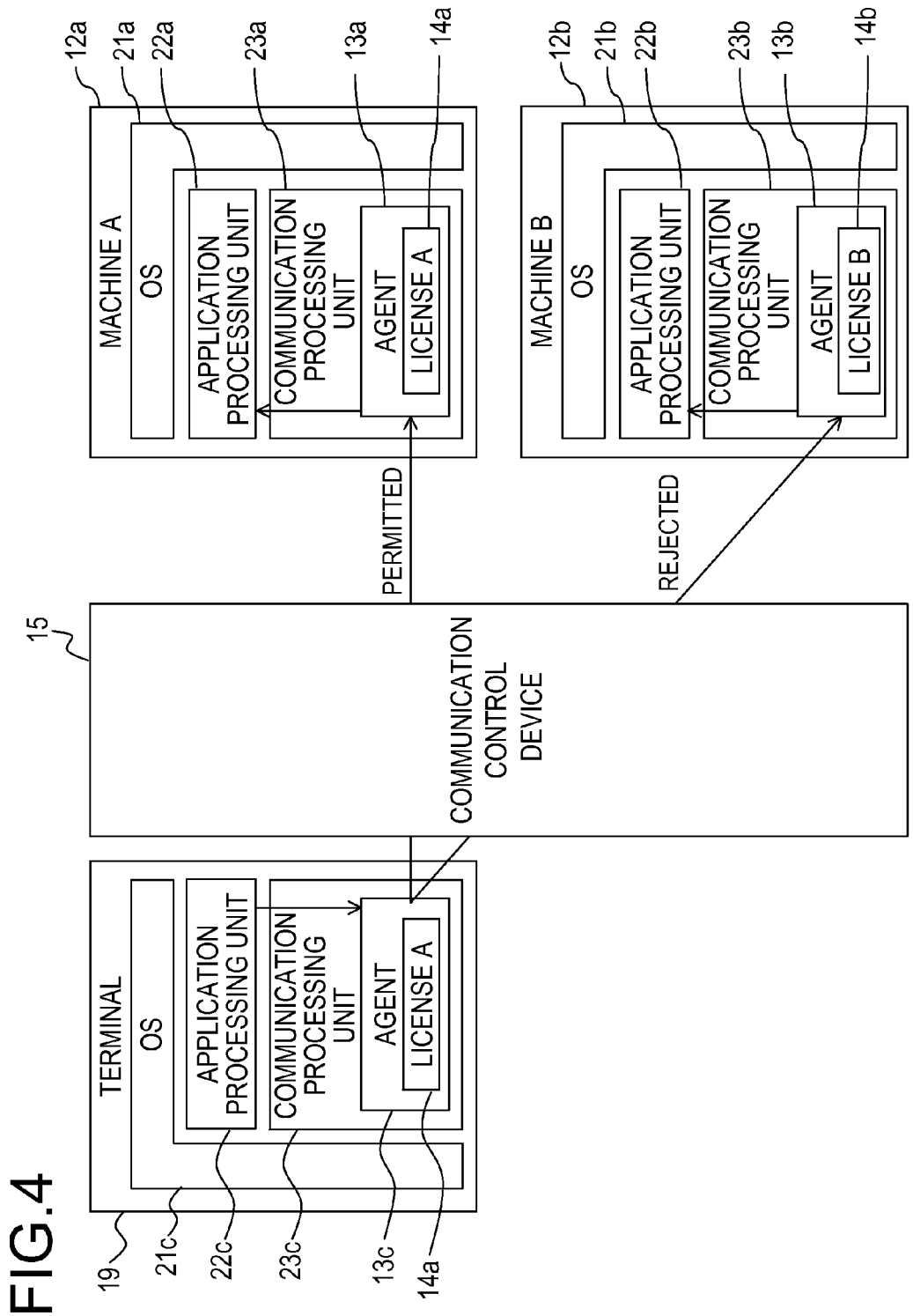

FIG.5

```
D_MAC = B0:AC:FA:5B:92:EB (MAC ADDRESS OF MACHINE A)
D_IP  = 169.128.242.100 (IP ADDRESS OF MACHINE A)
M_NUM = MANAGEMENT NUMBER

[access.1]
S_MAC = B0:AC:FA:32:28:DB  (MAC ADDRESS OF TERMINAL T1)
P_NUM = SSH (COMMUNICATION PROTOCOL USED BY TERMINAL T1)
P_VEC = 0 (TO MACHINE A FROM TERMINAL T1)

[access.2]
S_MAC = B0:AC:FA:32:A1:DF  (MAC ADDRESS OF TERMINAL T2)
P_NUM = HTTP (COMMUNICATION PROTOCOL USED BY TERMINAL T2)
P_VEC = 0 (TO MACHINE A FROM TERMINAL T2)

[access.3]
S_MAC = B0:AC:FA:32:A1:DF  (MAC ADDRESS OF TERMINAL T2)
P_NUM = 8080 (COMMUNICATION PORT USED BY TERMINAL T2)
P_VEC = 0 (TO MACHINE A FROM TERMINAL T2)
```

FIG.7

CONTENTS OF LICENSE A

```
D_MAC = B0:AC:FA:5B:92:EB (MAC ADDRESS OF MACHINE A)
D_IP  = 169.128.242.100 (IP ADDRESS OF MACHINE A)
M_NUM = MANAGEMENT NUMBER
[access.1]
S_MAC = B0:AC:FA:32:28:DB  (MAC ADDRESS OF TERMINAL T1)
P_NUM = SSH (COMMUNICATION PROTOCOL USED BY TERMINAL T1)
P_VEC = 0 (TO MACHINE A FROM TERMINAL T1)
```

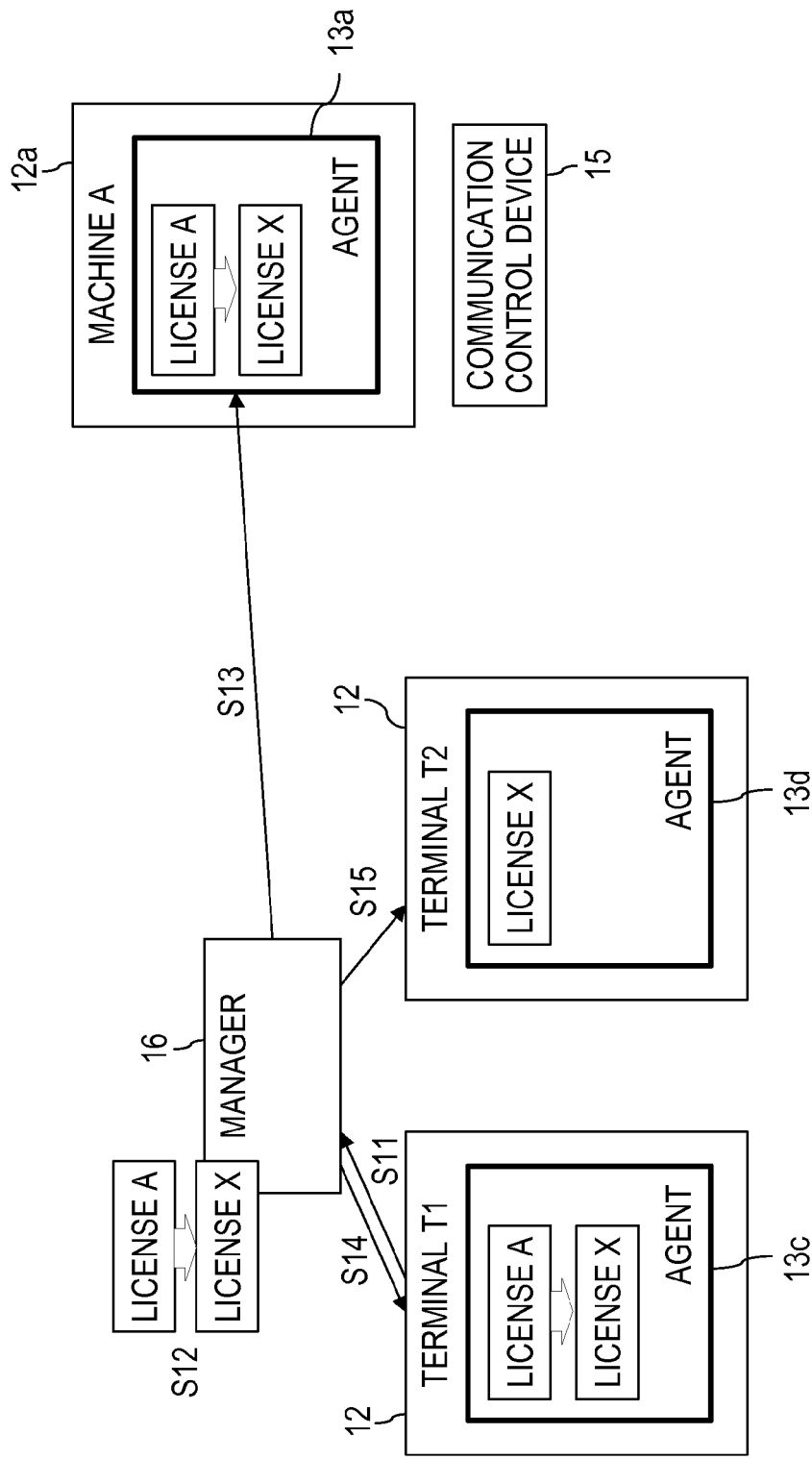

FIG.9A

CONTENTS OF LICENSE A

D_MAC = B0:AC:FA:5B:92:EB (MAC ADDRESS OF MACHINE A)
D_IP  = 169.128.242.100 (IP ADDRESS OF MACHINE A)
M_NUM = MANAGEMENT NUMBER
[access.1]
S_MAC = B0:AC:FA:32:28:DB (MAC ADDRESS OF TERMINAL T1)
P_NUM = SSH (COMMUNICATION PROTOCOL USED BY TERMINAL T1)
P_VEC = 0 (TO MACHINE A FROM TERMINAL T1)

FIG.9B

CONTENTS OF LICENSE X

D_MAC = B0:AC:FA:5B:92:EB (MAC ADDRESS OF MACHINE A)
D_IP  = 169.128.242.100 (IP ADDRESS OF MACHINE A)
M_NUM = MANAGEMENT NUMBER
[access.1]
S_MAC = B0:AC:FA:32:28:DB (MAC ADDRESS OF TERMINAL T1)
P_NUM = SSH (COMMUNICATION PROTOCOL USED BY TERMINAL T1)
P_VEC = 0 (TO MACHINE A FROM TERMINAL T1)

[access.2]
S_MAC = B0:AC:FA:32:A1:DF (MAC ADDRESS OF TERMINAL T2)
P_NUM = HTTP (COMMUNICATION PROTOCOL USED BY TERMINAL T2)
P_VEC = 0 (TO MACHINE A FROM TERMINAL T2)

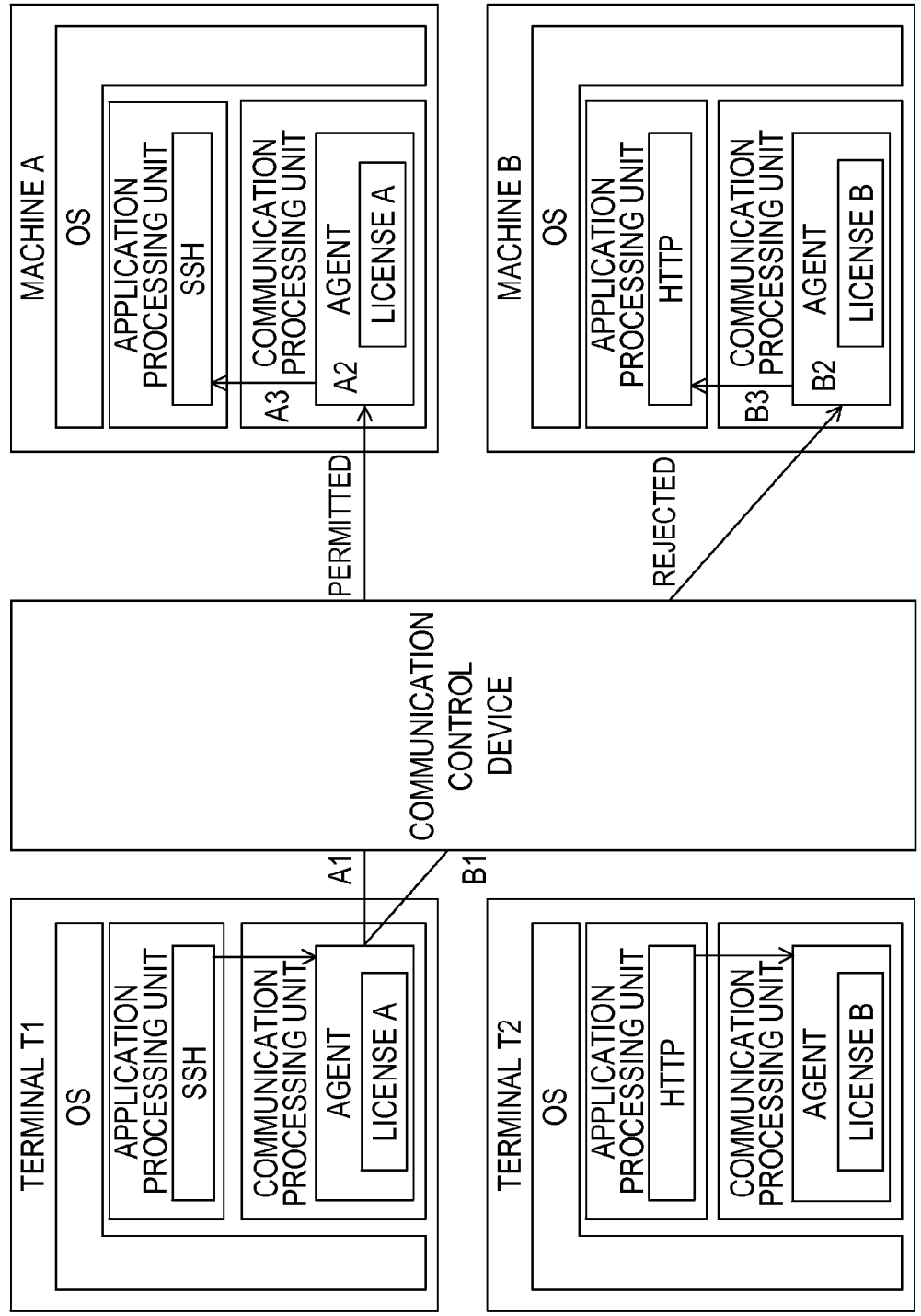

FIG.12A

CONTENTS OF LICENSE A

D_MAC = B0:AC:FA:5B:92:EB (MAC ADDRESS OF MACHINE A)
D_IP = 169.128.242.100 (IP ADDRESS OF MACHINE A)
M_NUM = MANAGEMENT NUMBER
[access.1]
S_MAC = B0:AC:FA:32:28:DB (MAC ADDRESS OF TERMINAL T1)
P_NUM = SSH
P_VEC = 0 (TO MACHINE A FROM TERMINAL T1)

FIG.12B

CONTENTS OF LICENSE B

D_MAC = B0:AC:FA:5B:92:EC (MAC ADDRESS OF MACHINE B)
D_IP = 169.128.242.200 (IP ADDRESS OF MACHINE B)
M_NUM = (IP ADDRESS OF MACHINE B)
[access.1]
S_MAC = B0:AC:FA:32:A1:DF (MAC ADDRESS OF TERMINAL T2)
P_NUM = HTTP
P_VEC = 0 (TO MACHINE B FROM TERMINAL T2)

DEPLOYMENT CONTROL DEVICE AND DEPLOYMENT CONTROL METHOD FOR DEPLOYING VIRTUAL MACHINE FOR ALLOWING ACCESS

CROSS-REFERENCE TO RELATED APPLICATION

This application is based upon and claims the benefit of priority of the prior Japanese Patent Application No. 2014-230229, filed on Nov. 12, 2014, the entire contents of which are incorporated herein by reference.

FIELD

The embodiments discussed herein are related to a deployment control device and a deployment control method.

BACKGROUND

In order to ensure security of a machine such as physical servers and virtual servers, access control is set in both the machine and a communication control device. Therefore, in order to ensure high security, whenever a machine is added to or deleted from a communication network, an operator changes settings of access control of the communication control device.

However, in a machine operation under a cloud environment where addition and deletion of machines occur particularly frequently, the operator may poorly respond because the number of changes in the access control settings is large, and it may be impossible to fully ensure security.

If security is not ensured, it may result in a risk that an access may be made to a machine to which an access is to be prohibited.

There is a related technique to enable the safe use of computer resources in a terminal with low computing performance from a non-safe user terminal through a non-safe network. In this related technique, a license issuing device confirms a user password inputted by a user, generates a communication key and a license, and transmits them with a date/time and an expiration of the communication key to a user terminal. The user terminal encrypts the license, a user identifier, and the date/time with the communication key, and transmits the result to a server. The server decodes the license received from the user terminal with a server password, examines the expiration of the communication key on the basis of the decoded result, decodes the received encrypted user identifier and date/time when the communication key does not expire, and transmits the date/time encrypted with the communication key to the user terminal.

A related technique is disclosed in, for example, Japanese Laid-open Patent Publication No. 2005-004412.

In the above-described related technique, in order to check the validity of communication between the terminal and the server, the license allocated by the license issuing device is used.

However, in the related technique, security is not sufficiently secured over an illegal access that is made immediately after deployment of a machine.

SUMMARY

According to an aspect of the present invention, provided is a deployment control device including a processor. The processor is configured to receive, from a first terminal device, a deployment request for requesting deployment of a virtual machine. The processor is configured to generate, in response to the received deployment request, the virtual machine configured to hold first permission information corresponding to unique information of the first terminal device, and selectively allow an access from a terminal device having permission information identical to the first permission information. The processor is configured to transmit the first permission information to the first terminal device.

The object and advantages of the disclosure will be realized and attained by means of the elements and combinations particularly pointed out in the claims. It is to be understood that both the foregoing general description and the following detailed description are exemplary and explanatory and are not restirctive of the disclosure, as claimed.

BRIEF DESCRIPTION OF DRAWINGS

FIG. 3 is a diagram illustrating an example of a license management table according to the present embodiment;

FIG. 4 is a diagram illustrating an agent according to the present embodiment;

FIG. 5 is a diagram illustrating an example of a license to permit an access from a plurality of terminals (terminal T1, terminal T2) to machine A in Example_1 of the present embodiment;

FIG. 7 is a diagram illustrating an example of a license in Example_1 of the present embodiment;

FIG. 8 is a diagram illustrating a process when a terminal requesting access permission is added in Example_1 of the present embodiment;

FIGS. 9A and 9B are diagrams illustrating an example of a license before and after updating in Example_1 of the present embodiment;

FIG. 11 is a diagram illustrating a process of accessing a machine by a terminal in Example_1 of the present embodiment;

FIGS. 12A and 12B are diagrams illustrating examples of a license used in FIG. 11;

DESCRIPTION OF EMBODIMENT

Figure 1:
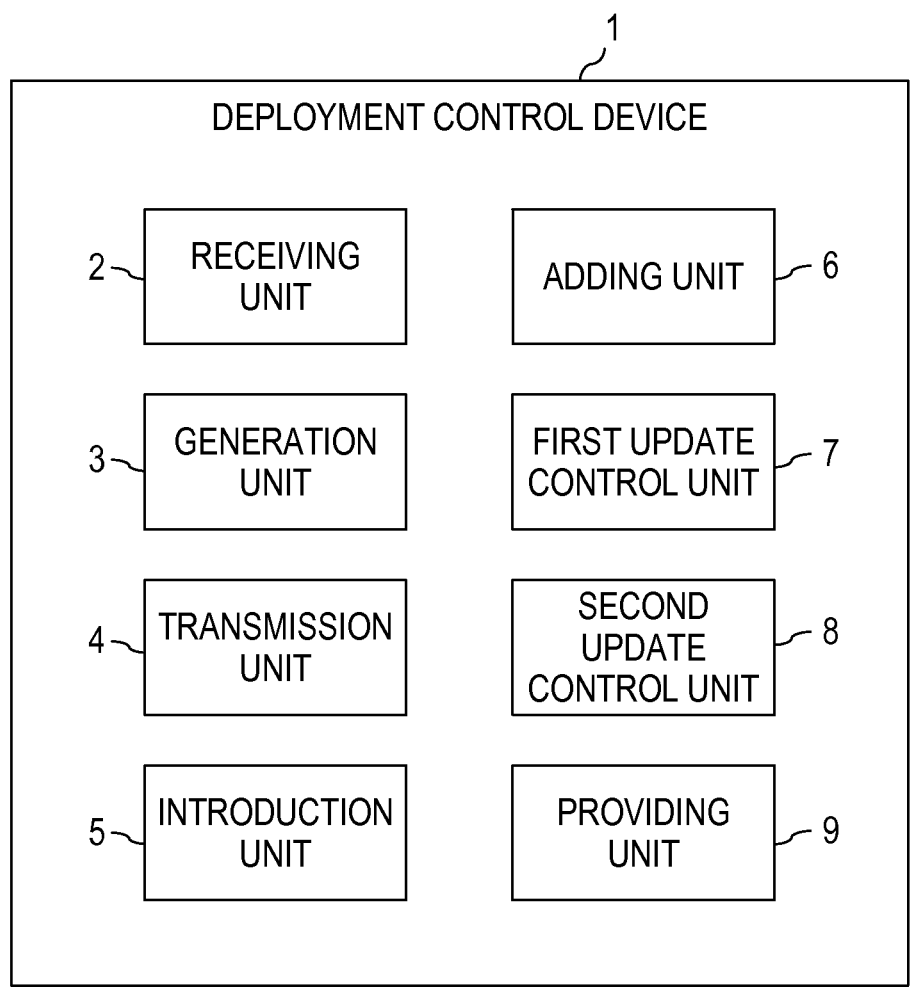
FIG. 1 is a diagram illustrating an example of a deployment control device according to the present embodiment.

An access control setting to prevent an access to a machine such as a physical server and a virtual server from a terminal device which is not permitted to have an access is performed in both a communication control device and the machine. Among them, an operator performs a setting operation of the communication control device.

In an environment that is formed by a multiple communication control devices (for example, M number of communication control devices) and machines, when a machine is added, the operator performs setting operations for all of the M number of communication control devices. For example, in a cloud center having two communication control devices, an addition or a deletion occurs for 30 machines a day on average. In this cloud center, when security is to be ensured, setting changes occur 60 times (2×30=60 times) a day. Thus, when there is a change in access control settings, it is necessary to change the settings in all devices under the cloud environment (first problem).

Since it takes specialized skills to set an access control of a communication control device, the number of operators capable of setting an access control is limited. In addition, since the setting operation is performed manually, there is always a risk of misconfiguration.

A machine user requests a change of access control settings of the communication control devices to the operator each time a machine is added or deleted in order to ensure security. However, because there are a lot of setting changes in a cloud environment, there is a problem that it requires a huge amount of time for an operator to carry out the access control manually. In this way, when the access control is performed by the operator in the cloud environment, it takes a lot of time (second problem).

Further, since the setting change of the access control is limited to a timing at which the operator is available to perform the operation, there is a problem that the setting is not changed promptly when the user requests the setting change. Thus, security is not ensured at the user's own timing (third problem).

As a solution to the first to third problems described above, it is considered that a manager (management apparatus) centrally managing the machine lending under the cloud environment causes the communication control devices to automatically change the access control settings every time a machine is deployed. However, with conventional techniques, it does not work when it is attempted to automatically reflect the access control setting in the communication control devices by simply providing a manager.

There are a plurality of communication control devices (for example, a router, a switching hub, a firewall, a proxy) depending on applications, and a setting method of access control is different between these communication control devices. Communication control devices are commercially available from several manufacturers, and a setting method of access control is different for each manufacturing company even in communication control devices of the same type. Therefore, when the number of manufacturers is represented by S and the number of types of communication control devices commercially available from the respective manufacturers is represented by Tk (k=1, 2, ..., S), the number of types of devices to be handled by the automation is $\Sigma Tk$.

In a general communication network environment, communication control devices of a plurality of manufacturers are often used. Therefore, in order to automate the access control settings, it is requested that the access control settings handle all devices of all manufacturers. Even when the automation of the access control setting is made to handle all the communication control devices sold to date, it is also necessary to handle a new device sold in the future. Therefore, a burden remains that the operator should update the data manually. Thus, in the environment in which a plurality of communication control devices are present, although the setting of the communication control devices is automated, the burden of the operator remains due to data update (fourth problem).

As another solution to the first to third problems described above, rather than performing the access control setting in the communication control devices by the operator, it may be considered to ensure security by causing the user to change the firewall settings of the machine to accept only an access from a predetermined terminal device. In this case, since the firewall performs the access control settings on the basis of an internet protocol (IP) address of the terminal, it is necessary for the IP address of the terminal device to be fixed. However, the IP address of the terminal is often changed separately from the intention of the use, for example, network address translation (NAT) conversion, proxy, dynamic host configuration protocol (DHCP). Therefore, since it is limited to an operation under a limiting environment in which the IP address of the terminal device is not changed in order to accept only an access from a particular terminal device by using a firewall of the machine, it is not applicable to a general network environment. Thus, in an environment where the IP address of the terminal is changed, ensuring security using a firewall is not applicable (fifth problem).

In addition, in the first place when a machine is deployed in a cloud environment, a firewall of the machine is not yet set. Therefore, in the case of a method of ensuring security in the firewall, it is not possible to ensure security until the firewall is set after starting the machine. Until the firewall is set, the machine is exposed in an unprotected state and it becomes a security risk. Therefore, it requires a method in which the user may ensure security from the time of deploying the machine. As described above, it is not possible to ensure security from the time when the user has deployed the machine (sixth problem).

As described above, there are a plurality of communication control devices in the cloud environment. In the environment where the IP address of the terminal is changed, the user who has deployed the machine is unable to ensure security promptly by himself or herself. Also, if there is a change in the access control settings, it is necessary to reflect the change to all machines and communication control devices in the environment. Further, in order to ensure security of a machine, it is desirable to establish security of the machine before the time when access to the machine occurs.

FIG. 1 illustrates an example of a deployment control system according to the present embodiment. A deployment control device 1 includes a receiving unit 2, a generation unit 3, and a transmission unit 4.

The receiving unit 2 receives a deployment request of deploying a virtual machine from a terminal device. An example of the receiving unit 2 is a central processing unit (CPU) 42 (see FIG. 18) that functions as a manager 16 (see FIG. 2) by executing cloud infrastructure software 17 (see FIG. 2). In the following description, for convenience, functions realized by executing the cloud infrastructure software 17 are also referred to as the cloud infrastructure software 17.

In response to the received deployment request, the generation unit 3 generates a virtual machine that stores permission information corresponding to unique information of the terminal device which has sent the deployment request and selectively allows an access from a terminal device having the stored permission information. An example of the generation unit 3 is the CPU 42 that functions as the manager 16 by executing the cloud infrastructure software 17.

The transmission unit 4 transmits the permission information corresponding to the unique information to the terminal device that has sent the deployment request. An example of the transmission unit 4 is the CPU 42 that functions as the manager 16 by executing the cloud infrastructure software 17.

Through the configuration as described above, from the timing of generating the virtual machine, it is possible to suppress an unauthorized access immediately after generating the virtual machine.

The generation unit 3 introduces, into the virtual machine, an agent which selectively permits an access from a terminal device having the stored permission information. The agent is a function realized by executing an agent program.

Through the configuration as described above, the virtual machine may selectively allow an access from a terminal device having the stored permission information.

The generation unit 3 validates a communication function of the virtual machine after validating the agent introduced into the virtual machine.

Through the configuration as described above, from the timing of generating the virtual machine, it is possible to selectively permit an access and suppress an unauthorized access immediately after generating the virtual machine.

The generation unit 3, if it is specified to validate a communication function of a virtual machine after validating an agent in the deployment request, validates the communication function of the virtual machine after validating the agent introduced into the virtual machine.

Through the configuration as described above, if the user may select a timing to validate an agent after deploying a virtual machine into which the agent has been introduced, it is possible to validate the agent before opening the machine to the external network. Thus, it is possible to ensure security before the virtual machine is accessed from a terminal device which is not permitted to have an access.

The generation unit 3, if it is specified to introduce an agent before validating a communication function of a virtual machine in the deployment request, introduces the agent into the virtual machine. Further, the generation unit 3 provides permission information corresponding to the unique information of the terminal device, which has sent the deployment request, to the agent introduced into the virtual machine. Furthermore, the generation unit 3 validates the communication function of the virtual machine after validating the agent introduced into the virtual machine.

Through the configuration as described above, even when deploying a virtual machine into which an agent has not been introduced, it is possible to introduce an agent into the virtual machine and validate the agent before opening the virtual machine to the external network. Therefore, it is possible to ensure security before the virtual machine is accessed from a terminal device which is not permitted to have an access.

The deployment control device 1 further includes an introduction unit 5. Upon receiving a deployment request, the introduction unit 5 introduces an agent into a terminal device which has sent the deployment request if an agent selectively allowing an access from a virtual machine having permission information has not been introduced into the terminal device. An example of the introduction unit 5 is the CPU 42 that functions as the manager 16 by executing the cloud infrastructure software 17.

Through the configuration as described above, the agent may be introduced into the terminal device which has sent the deployment request.

The deployment control device 1 further includes an adding unit 6, a first update control unit 7, a second update control unit 8, and a providing unit 9.

In response to a request of issuing permission information to a second terminal, which has been sent from a first terminal having first permission information corresponding to the unique information of the first terminal having sent a deployment request, the adding unit 6 generates second permission information obtained by adding permission information corresponding to the unique information of the second terminal to the first permission information. An example of the adding unit 6 is the CPU 42 that functions as the manager 16 by executing the cloud infrastructure software 17.

The first update control unit 7 provides the generated second permission information to the virtual machine to update the first permission information stored in the virtual machine to the second permission information. An example of the first update control unit 7 is the CPU 42 that functions as the manager 16 by executing the cloud infrastructure software 17.

In response to a request from the first terminal device, the second update control unit 8 provides the second permission information to the first terminal device to update the first permission information stored in the first terminal device to the second permission information. An example of the second update control unit 8 is the CPU 42 that functions as the manager 16 by executing the cloud infrastructure software 17.

In response to a request from the second terminal device, the providing unit 9 provides the second permission information to the second terminal device. An example of the providing unit 9 is the CPU 42 that functions as the manager 16 by executing the cloud infrastructure software 17.

Through the configuration as described above, when there is a request for adding a new terminal to a cloud system from a terminal which has an access authorization, it is possible to add the new terminal to the cloud system. Thus, when there is an addition request from a highly reliable terminal, it is possible to add a new terminal to the cloud system.

Figure 2:
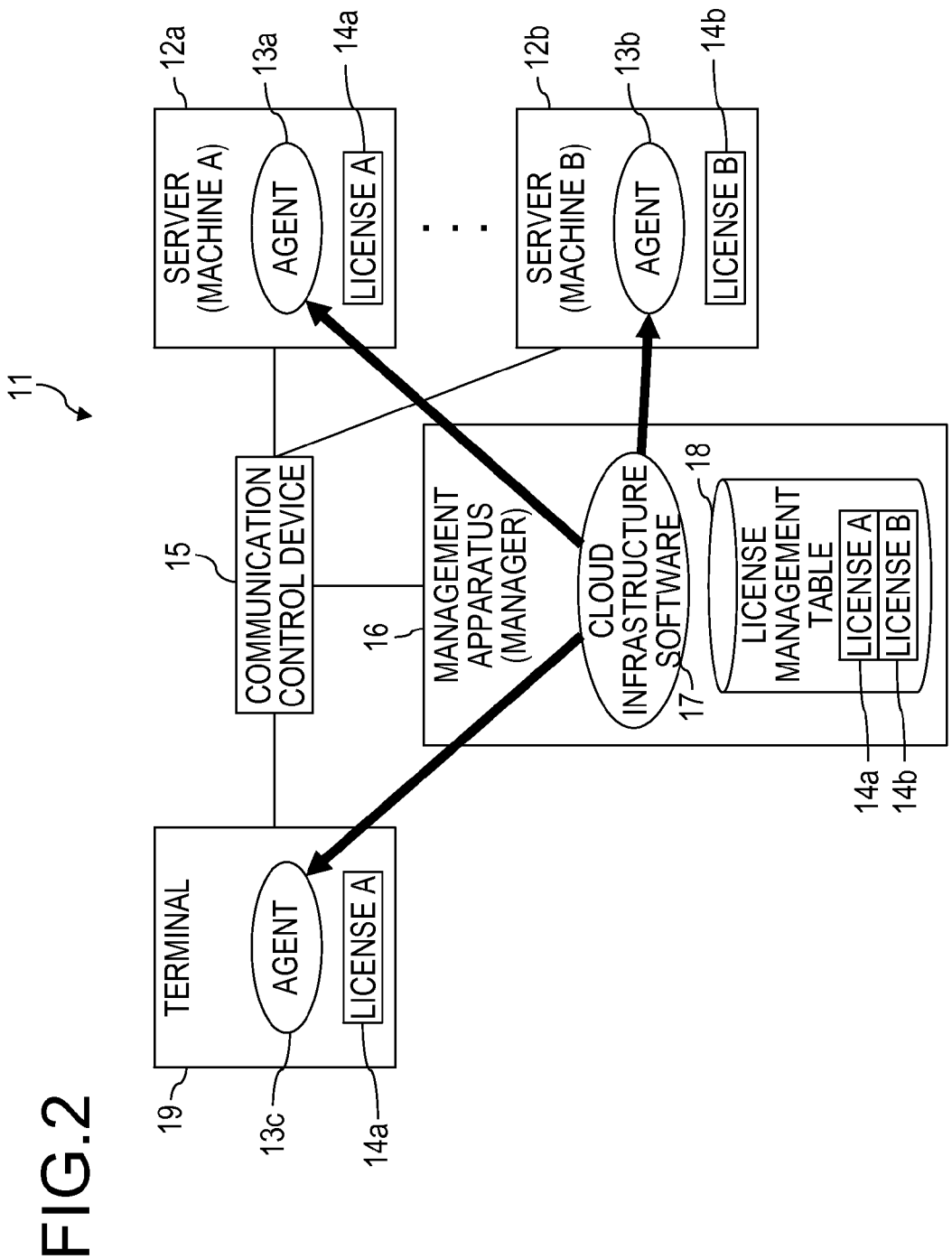
FIG. 2 is a diagram illustrating an exemplary configuration of a cloud system according to the present embodiment.

Hereinafter, the present embodiment will be described in more detail. FIG. 2 illustrates an exemplary configuration of a cloud system according to the present embodiment. In the operation of machines under a cloud environment, there is a manager to centrally manage machines such as virtual machines (virtual servers) and physical machines (physical servers). The manager utilizes cloud infrastructure software for building "Infrastructure as a Service (IaaS)".

In FIG. 2, a cloud system 11 includes a management apparatus 16, a communication control device 15, and a plurality of servers (server 12a (machine A), server 12b (machine B), . . . ). An information processing terminal 19

(hereinafter referred to as "terminal 19") is physically connected to the cloud system 11 via the communication control device 15.

Figure 18:
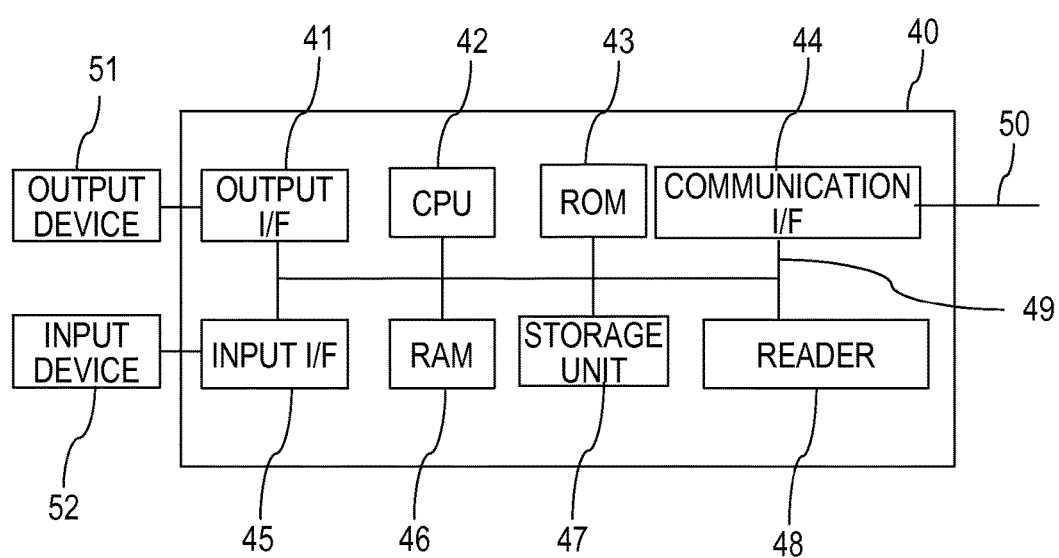
FIG. 18 is a diagram illustrating an exemplary hardware configuration of a computer which executes a program.

The management apparatus 16 is an information processing apparatus including, for example, a CPU, a memory, a storage unit, and a communication interface, as illustrated in FIG. 18. A license management table 18 is stored in the storage unit of the management apparatus 16. The management apparatus 16 functions as the manager 16 by executing the installed cloud infrastructure software 17. The cloud infrastructure software 17 includes a function of generating and distributing a license used to determine an accessibility.

The communication control device 15 is an information processing apparatus including, for example, a CPU, a memory, a storage unit, and a communication interface, as illustrated in FIG. 18. The communication control device 15 controls a route of the communications network and performs access control. The communication control device 15 may include functions of a router, a switching hub, a firewall, a proxy, and the like.

Each of the servers 12a and 12b is an information processing apparatus including, for example, a CPU, a memory, a storage unit, and a communication interface, as illustrated in FIG. 18. The servers 12a and 12b are included in a server group managed by the management apparatus 16 that executes the cloud infrastructure software 17, namely, a server group under the control of the manager 16. In the following description, the servers 12a and 12b are referred to as machines 12a and 12b, respectively. A symbol "a" is assigned to the configuration and the functions of the machine 12a. A symbol "b" is assigned to the configuration and the functions of the machine 12b. The machines 12a and 12b are collectively referred to as a machine 12. An agent 13 (13a, 13b) is introduced into the machine 12 to determine the communication availability on the basis of a license 14 (14a, 14b).

The terminal 19 is an information processing apparatus including, for example, a CPU, a memory, a storage unit, and a communication interface, as illustrated in FIG. 18. Similarly to the machine 12, an agent 13c is introduced into the terminal 19 to determine the communication availability on the basis of the license 14. In the following, a symbol "c" may be assigned to the configuration and the functions of the terminal 19.

In FIG. 2, upon receiving a request for using the machine 12 from the terminal 19, the manager 16 deploys the agent 13, to which the license 14 corresponding to the request is distributed, to the machine 12. In addition, the manager 16 distributes a license (an identical license in the present embodiment) corresponding to the license distributed to the agent 13 of the machine 12 to the terminal which has made the request for using the machine 12.

The agent 13 replaces the access control function of the machine 12 and the communication control device 15. When controlling an access, the agent 13 uses the license to determine whether to permit the access.

The license includes an IP address (machine side), media access control (MAC) addresses (machine side and terminal side), a management number of the license, a communication port number (or communication protocol), and information on the direction of communication of the communication port number. In the following description, a communication protocol is referred to as "protocol."

The manager 16 includes a management function of managing the license 14. The manager 16 distributes the license 14 to the machine 12. The agent 13 is introduced into the terminal 19 and the machine 12.

FIG. 3 illustrates an example of a license management table according to the present embodiment. The license management table 18 includes data items such as "M_NUM" 18-1, "MAC address" 18-2, "license management information" 18-3, and "license content" 18-4.

In the "M_NUM" 18-1, a management number for identifying the license is stored. In some situations, a plurality of managers may be present. Even in such cases, M_NUM is assumed to be unique independently of the managers. In the "MAC address" 18-2, a MAC address of a terminal, for which the license is created, is stored. In the "license management information" 18-3, management information for identifying the license is stored. In the "license content" 18-4, information on an access source and an access destination which are enabled to communicate with each other by the permission, that is, the contents of the license, is stored.

The "license content" 18-4 includes "D_MAC" 18-5, "D_IP" 18-6, and [access. x] 18-7. In the "D_MAC" 18-5, a MAC address of the machine to be accessed is stored. In the "D_IP" 18-6, an internet protocol (IP) address of the machine to be accessed is stored. D_MAC and DIP are assumed to be unique among all licenses managed by the manager.

In the [access. x] 18-7, information on one or more terminals requesting communication (requesting permission) is stored. The [access. x] 18-7 includes "S_MAC" 18-8, "P_NUM" 18-9, and "P_VEC" 18-10. In the "S_MAC" 18-8, a MAC address of a terminal requesting communication (requesting permission) is stored. In the "P_NUM" 18-9, a communication method (communication port number or protocol) to be used when communication is permitted is stored. In the "P_VEC" 18-10, a communication direction (0: to the machine from the terminal, 1: to the terminal from the machine, 2: bi-directional) of each permitted communication port is stored.

Each time a terminal 19 permitted to access the machine 12 is added, or a communication port (or protocol) is added, a combination of [access.x] (S_MAC, P_NUM, P_VEC) is added to the license 14 as one record. [access.x] represents the x-th access permission record.

FIG. 4 illustrates an agent in the present embodiment. Operating systems (OSs) 21a, 21b, and 21c are installed in machine A, machine B, and the terminal 19, respectively. On the OSs 21a, 21b, and 21c, application processing units 22a, 22b, and 22c and communication processing units 23a, 23b, and 23c are running.

The application processing units 22a, 22b, and 22c execute application programs such as Secure Shell (SSH) and Hypertext Transfer Protocol (HTTP).

The agent 13 (13a, 13b, and 13c) permits communication of the communication port number (or protocol) and the communication direction that have been registered in the license when the license stored in the terminal 19 is identical to the license stored in the machine 12.

As illustrated in FIG. 4, since both the terminal 19 and the machine A 12a have a license A 14a, the agent 13a permits communication from the terminal 19. Since the machine B 12b has a license B 14b and the licenses stored in the terminal 19 and the machine B 12b are different, the agent 13b does not permit communication from the terminal 19.

The communication processing units 23a, 23b, and 23c transmit communication information permitted by the agent 13 (13a, 13b, and 13c) to the application processing units 22a, 22b, and 22c.

Thus, according to the present embodiment, security may be ensured regardless of the increase/decrease and the types of the communication control devices. Security may also be ensured by identifying the terminal even in an environment in which the IP address of the terminal is changed.

EXAMPLE_1

A cloud system in Example_1 is identical to the system illustrated in FIG. 2, and includes a manager 16 having a license management function and agents 13 performing access control. A license 14 is used to determine whether an agent 13 permits an access from other machines or terminals.

A license management function has been added to cloud infrastructure software 17 which is installed in the manager 16. The manager 16 performs management of the license including creating, distributing, and updating of a license.

The agent 13 performs access control by determining the accessibility on the basis of the license stored in the machine 12 and the license stored in the terminal 19. The agent 13 is introduced into the machine 12 and the terminal 19. The introduction of the agent 13 into the machine 12 is performed by providing the machine 12 that has installed the agent 13 when the operating side provides the machine 12 to the user. The terminal 19 downloads the agent 13 from the manager 16 to introduce the agent 13 into the terminal 19.

The license 14 is an information file in which unique information and a communication method for the communication performed between the machine 12 and the terminal 19 are registered as information for access control. The license 14 is retained in both the machine 12 and the terminal 19. The license 14 includes information used to confirm that a combination of the machine 12 and the terminal 19 is correct, and information used to permit communication.

The information used to confirm that a combination of a machine and a terminal is correct includes a MAC address (D_MAC) of the machine, an IP address (D_IP) of the machine, a MAC address (S_MAC) of the terminal, and a management number (M_NUM) of the license.

The information used to permit communication includes a communication port number (or protocol) (P_NUM), a communication direction (P_VEC) (0: to the machine from the terminal, 1: to the terminal from the machine, 2: bi-directional) of each communication port.

Each time the terminal 19 permitted to access the machine 12 is added, or a communication port (or protocol) is added, a combination of [access.x] (S_MAC, P_NUM, P_VEC) is added to the license 14 as one record.

FIG. 5 illustrates an example of a license to permit an access from a plurality of terminals (terminal T1, terminal T2) to the machine A in Example_1 of the present embodiment. In FIG. 5, three accesses (access.1, access.2, access.3) are permitted to access the machine A.

In FIG. 5, access.1 indicates that the terminal T1 accesses the machine A using SSH. Access.2 indicates that the terminal T2 accesses the machine A using HTTP. Access.3 indicates that the terminal T2 accesses the machine A using communication port number 8080.

When the machine 12 is deleted from the communication network, all licenses of permitting connection to the machine 12 are discarded. Specifically, when the manager 16 detects that one machine is deleted from the machines managed by the cloud infrastructure software 17, the manager 16 deletes the record including D_MAC and DIP of the deleted machine from the license management table 18.

Figure 6:
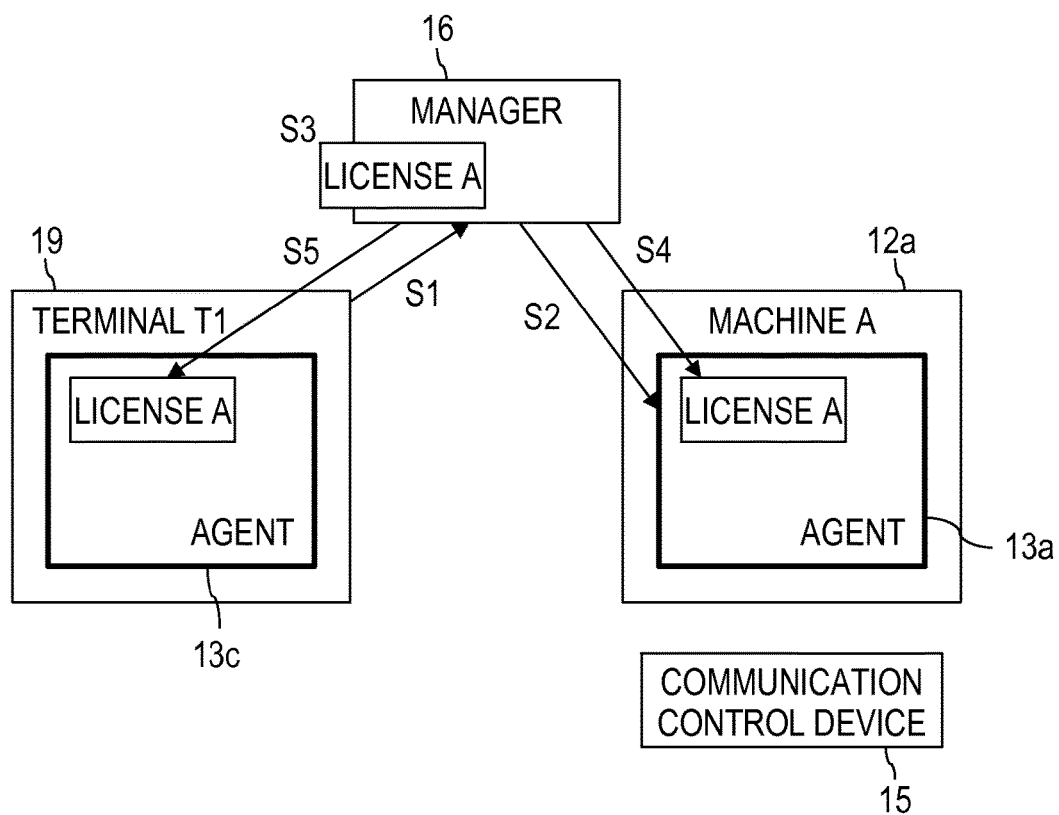
FIG. 6 is a diagram illustrating a process when a machine is added in Example_1 of the present embodiment.

FIG. 6 illustrates a process when a machine is added in Example_1 of the present embodiment. Information for building a cloud environment is deployed in a machine such as a physical machine or a virtual machine by the cloud infrastructure software 17. When building a new cloud system, or when extending the cloud system, a machine is newly added to the machines managed by the cloud infrastructure software 17. This case will be described below.

A terminal T1 transmits, to the manager 16, request information to request for use of a machine A to be newly added to the cloud system (S1). In this case, for example, the terminal T1 includes a communication port number (or protocol) and a communication direction in the request information as described below.

Protocol used for communication between the terminal T1 and the machine A: SSH

Communication direction: to the machine A from the terminal T1

The manager 16 introduces an agent 13 into the machine A to put the machine A into an available state (S2).

The manager 16 registers access control information for the terminal T1 and the machine A in license A (S3). Then, the license A illustrated in FIG. 7 is obtained. The manager 16 distributes the license A to the machine A (S4).

The terminal T1 introduces the license A and an agent 13 (if there is no agent) from the manager 16 (S5). The terminal T1 may download, at any time, the license A permitting an access by the terminal T1.

Next, a case will be described in which a request for adding a new terminal to a cloud system is made from a terminal which has an access authorization.

FIG. 8 illustrates a process when a terminal requesting an access authorization is added in Example_1 of the present embodiment. FIGS. 9A and 9B illustrate an example of a license before and after updating in Example_1 of the present embodiment.

The terminal T1 having the license A requests the manager 16 to add, to the license A that has already been created as illustrated in FIG. 9A, the contents of permitting an access from a terminal T2 (S11). In this case, the terminal T1 transmits, at the time of the request, information (MAC address of the terminal T2, communication port number or communication protocol, communication direction) on the terminal T2, as described below.

MAC address of the terminal T2: B0:AC:FA:32:A1:DF

Communication protocol used by the terminal T2: HTTP

The manager 16 creates license X by adding the information on the terminal T2 to the license A as illustrated in FIG. 9B (S12).

The manager 16 distributes the license X to the machine A having the license A to update the license A stored in the machine A to the license X (S13).

The terminal T1 having the license A downloads the license X from the manager 16 and updates the license A to the license X (S14).

The terminal T2 downloads the agent 13 and the license X from the manager 16 (S15).

Figure 10:
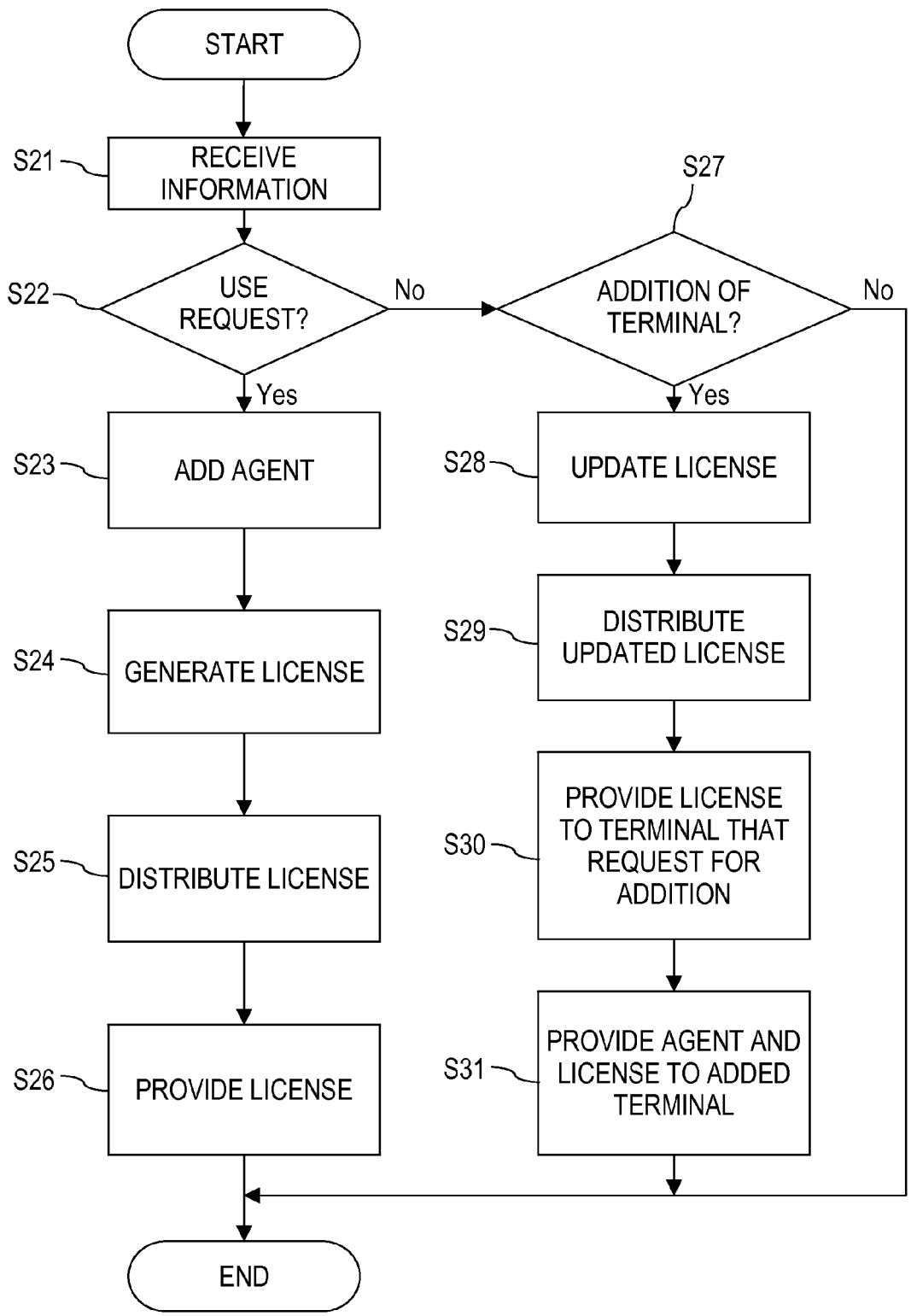
FIG. 10 is a flowchart illustrating a flow of a license issuance process in Example_1 of the present embodiment.

FIG. 10 illustrates a flow of a license issuance process performed by the manager in Example_1 of the present embodiment. The manager 16 receives information (S21). The manager 16 determines whether the received information is a use request for requesting to use a machine to be newly added to the cloud system (S22). The use request may be, for example, a deployment request of requesting to deploy a virtual machine.

When the received information is a use request for requesting to use a machine to be newly added to the cloud system ("Yes" in S22), the manager 16 puts the machine in an available state by adding an agent 13 to the machine (S23). In a case where the machine to be added is a physical machine, the manager 16 transmits the agent 13 to the physical machine, and the physical machine installs the agent 13. In a case where the machine to be added is a virtual machine, the manager 16 generates the virtual machine, deploys the generated virtual machine in a specified physical machine, and provides the agent 13 to the virtual machine.

The manager 16 generates a license on the basis of the unique information (D_MAC, D_IP) on the newly added machine, the specified communication method (P_NUM, P_VEC), and the unique information (S_MAC) on the terminal to be permitted to access the machine (S24).

The manager 16 distributes the generated license to the newly added machine (S25). Further, the manager 16 provides a license in response to a request from a terminal in which an agent 13 is installed (S26). If no agent is installed in the terminal, the manager provides not only the license but also an agent 13 to the terminal.

If the received information is request information to request an addition of a terminal to be permitted to access one machine constituting a cloud system ("No" in S22, "Yes" in S27), the manager 16 updates a license to access the machine by adding, to the license, information on the terminal to be added (S28).

The manager 16 distributes the updated license to the machine corresponding to the updated license (S29). In response to a request from the terminal which has sent the request for addition, the manager 16 provides the updated license to the terminal (S30). Furthermore, in response to a request from the added terminal, the manager 16 provides an agent 13 and the updated license to the added terminal (S31).

FIG. 11 illustrates a process of accessing the machine by the terminal in Example_1 of the present embodiment. FIGS. 12A and 12B illustrate an example of licenses used in FIG. 11. First, a case will be described in which an access is made from a terminal T1 having a license A to a machine A having a license A identical to the license A stored in the terminal T1 as illustrated in FIG. 12A.

(A1) In order to communicate with the machine A, the terminal T1 makes a connection with the agent of the machine A. At that time, the agent of the terminal T1 sends the content (license) information of the license A stored in the terminal T1 to the machine A.

(A2) The agent of the machine A confirms the license information sent from the terminal T1. In this case, the agent of the machine A confirms the license information sent from the terminal T1 to confirm that an identical license to the license A stored in the machine A exists therein.

(A3) The agent of the machine A permits the access by the terminal T1, using the communication protocol (for example: SSH) described in the license A, to an application to be used for communication.

Then, a case will be described in which an access is made from the terminal T1 which does not have license B to the machine B having license B as illustrated in FIG. 12B.

(B1) In order to communicate with the machine B, the terminal T1 makes a connection with the agent of the machine B. At that time, the agent of the terminal T1 sends the content (license) information of the license A stored in the terminal T1 to the machine B.

(B2) The agent of the machine B confirms the license information sent from the terminal T1. In this case, the agent of the machine B confirms the license information sent from the terminal T1 to confirm that an identical license to the license B stored in the machine B does not exist therein.

(B3) The agent of the machine B rejects the access by the terminal T1 to an application to be used for communication.

Figure 13:
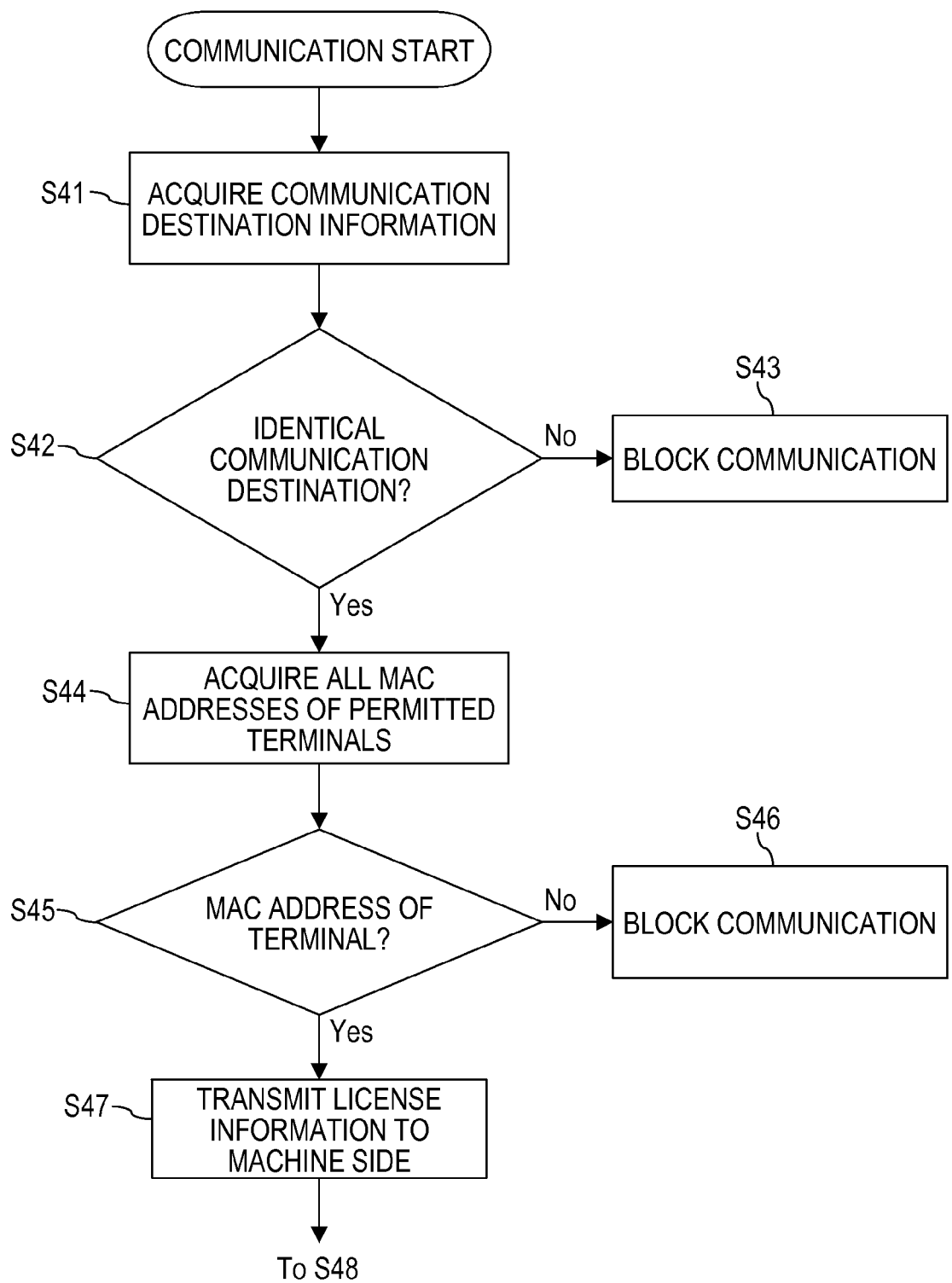
FIG. 13 is a flowchart illustrating a flow of a determination process performed in communication from a terminal into which an agent has been introduced to a machine into which an agent has been introduced in Example_1 of the present embodiment.
Figure 14:
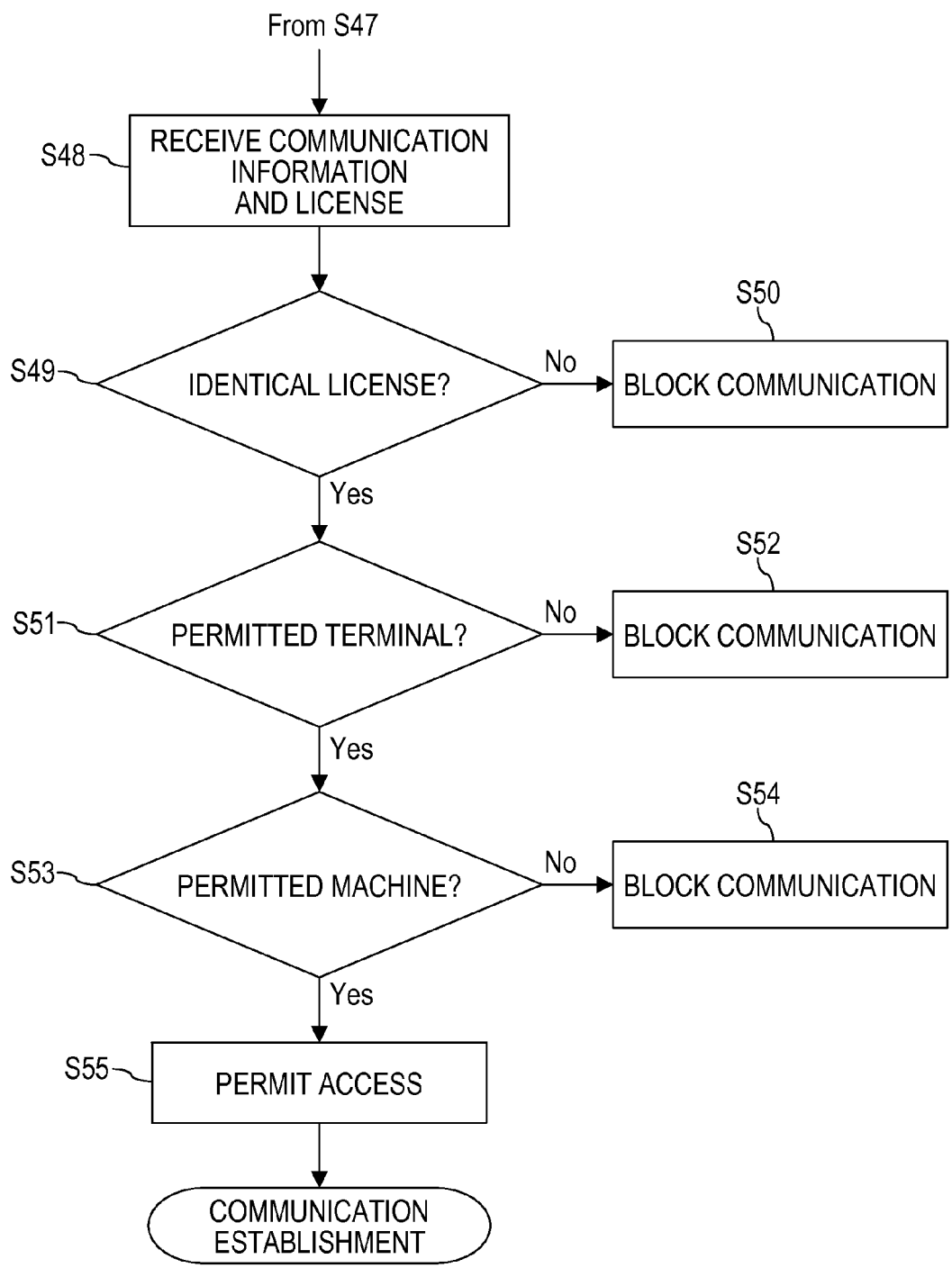
FIG. 14 is a flowchart illustrating a flow of a determination process performed in communication from a terminal into which an agent has been introduced to a machine into which an agent has been introduced in Example_1 of the present embodiment.

FIGS. 13 and 14 illustrate a flow of a determination process performed by agents during the communication from a terminal into which an agent has been introduced to a machine into which an agent has been introduced in Example_1 of the present embodiment.

The agent on the terminal side acquires communication destination information (MAC address, IP address) from header information included in the communication information which the terminal now intends to transmit (S41).

The agent on the terminal side determines whether the communication destination information (MAC address, IP address) acquired from the header information is identical to the communication destination information (D_MAC, D_IP) registered in the license held by the agent on the terminal side (S42).

If the communication destination information (MAC address, IP address) acquired from the header information is not identical to the communication destination information (D_MAC, D_IP) registered in the license held by the agent on the terminal side ("No" in S42), the agent on the terminal side performs the following process. That is, the agent on the terminal side blocks the communication without performing any processing (S43).

If the communication destination information (MAC address, IP address) acquired from the header information is identical to the communication destination information (D_MAC, D_IP) registered in the license held by the agent on the terminal side ("Yes" in S42), the agent on the terminal side performs the following process. That is, the agent on the terminal side acquires all the MAC addresses (S_MACs) of the terminals permitted to have access to the machine from the license held by the agent on the terminal side (S44).

The agent on the terminal side determines whether the MAC addresses (S_MACs) acquired from the license include the MAC address of the terminal in which the agent on the terminal side is installed (S45).

If the MAC addresses (S_MACs) acquired from the license do not include the MAC address of the terminal in which the agent on the terminal side is installed ("No" in S45), the agent on the terminal side performs the following process. That is, the agent on the terminal side determines that the communication to be performed from now includes unauthorized use of the license, and the agent on the terminal side blocks the communication (S46).

If the MAC addresses (S_MACs) acquired from the license include the MAC address of the terminal in which the agent on the terminal side is installed ("Yes" in S45), the agent on the terminal side performs the following process. That is, the agent on the terminal side transmits the license to the communication destination together with the communication information (S47). At this time, the agent on the terminal side sets the MAC address of the terminal, in which the agent on the terminal side is installed, in a data portion of the communication information consisting of a header portion and the data portion.

The machine receives the communication information and the license sent from the terminal (S48). Then, the agent on the machine side determines whether a license identical to the received license is stored in the machine (S49).

If the machine does not store therein a license identical to the license sent from the terminal ("No" in S49), the agent on the machine side determines that the terminal does not have an access authority to the machine and blocks the communication with the terminal (S50).

If the machine stores therein a license identical to the license sent from the terminal ("Yes" in S49), the agent on the machine side performs the following process. That is, the agent on the machine side determines whether a MAC address identical to the MAC address acquired from the received communication information is registered in the license as the terminal (S_MAC) permitted to have an access to the machine (S51). At this time, the MAC address acquired from the received communication information is the MAC address of a source terminal set in the data portion of the communication information in S47. The method of acquiring the MAC address of the source terminal is not limited thereto. For example, it is also possible to detect the MAC address of the received communication information by using a server having a host check function.

If a MAC address identical to the MAC address acquired from the received communication information is not registered in the license as the terminal (S_MAC) permitted to have an access to the machine ("No" in S51), the agent on the machine side performs the following process. That is, the agent on the machine side determines that the communication is from a terminal having a disguised MAC address of a regular terminal having a license, and the agent on the machine side blocks the communication with the terminal (S52).

If a MAC address identical to the MAC address acquired from the received communication information is registered in the license as the terminal (S_MAC) permitted to have an access to the machine ("Yes" in S51), the agent on the machine side performs the following process. That is, the agent on the machine side determines whether the MAC address and the IP address of the machine having the agent on the machine side are identical to the communication destination machine information (MAC address, IP address) of the license (S53).

If the MAC address and the IP address of the machine having the agent on the machine side are not identical to the communication destination machine information (MAC address, IP address) of the license ("No" in S53), the agent on the machine side performs the following process. That is, the agent on the machine side determines that the license has been captured illegally, and the agent on the machine side blocks the communication with the terminal (S54).

If the MAC address and the IP address of the machine having the agent on the machine side are identical to the communication destination machine information (MAC address, IP address) of the license ("Yes" in S53), the agent performs the following process. That is, the agent on the machine side permits the terminal which has sent the license to access the machine using the protocol registered in the license. Accordingly, a communication is established between the terminal and the machine.

EXAMPLE_2

Next, introduction of an agent and a validating timing will be described. In the above-described related technique, in order to check the validity of the communication between a terminal and a server, a license allocated by a license allocation apparatus is used. In the related technique, it is impossible to solve the following two problems.

(i) Since the mechanism allows an access from a terminal as long as the terminal has a license, it is impossible to prevent an unauthorized access from another terminal with a copy of the license.

(ii) It is impossible to ensure security immediately after the machine deployment which is essential in the case of ensuring security without an operator.

According to the present embodiment, since the access control is performed by introducing an agent into each of the terminal and the machine, it is possible to cope with the above problems. With respect to the problem (i) described above, since it is checked whether the terminal has a legitimate access right in a confirmation phase of the license in the access control, the problem may be solved.

With respect to the problem (ii), until security is ensured after deployment of the machine, the manager side controls so as not to open the network in the cloud system to the outside.

According to the present embodiment, security is ensured by introducing and validating the agent at a predetermined timing. As the timing of introducing and validating the agent, the following cases are considered:

(a) a case where a machine into which an introduction of an agent has been completed is deployed, and (a-1) a case where the agent is forcedly validated after deployment, or (a-2) a case where the user may select whether or not to validate the agent, and (b) a case where a machine into which no agent has been introduced is deployed and the user may select a timing of introducing an agent.

Hereinafter, with respect to the above-mentioned (a-1), (a-2), and (b), a flow will be described with reference to the drawings.

Figure 15:
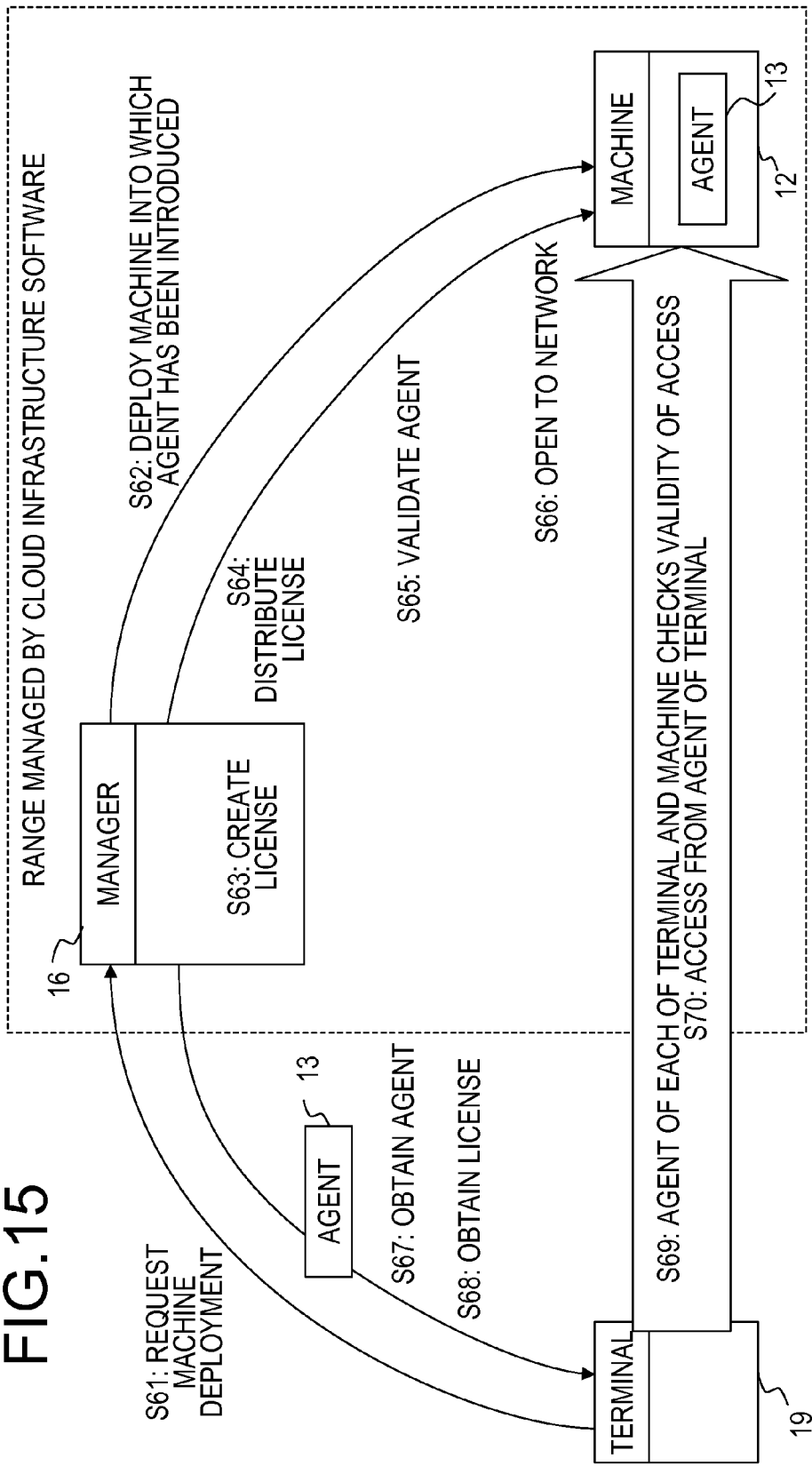
FIG. 15 is a diagram illustrating a case where a machine into which an introduction of an agent has been completed is deployed and the agent is forcedly validated after deployment in Example_2-1 of the present embodiment.

FIG. 15 is a diagram illustrating a case where a machine into which an introduction of an agent has been completed is deployed and the agent is forcedly validated after deployment in Example_2-1 of the present embodiment.

The terminal 19 requests the manager 16 to deploy the machine 12 (S61). The manager 16 deploys the machine 12 into which the agent 13 has been introduced (S62). The manager 16 creates a license by using information on the manager 16, the machine 12, and the terminal 19 (S63). The manager 16 distributes the license to the machine 12 (S64).

The manager 16 validates the agent 13 of the machine 12 (S65). The manager 16 allows an access to the machine 12 from the outside via the network by opening the machine 12 to the external network (S66).

The terminal 19 obtains the agent 13 from the manager 16 (S67). The terminal 19 obtains the license from the manager 16 (S68). The agent 13 of each of the terminal 19 and the machine 12 checks the validity of the access (S69). The agent 13 of the terminal 19 accesses the machine 12 when the access is permitted (S70).

According to Example_2-1 of the present embodiment, since the agent 13 is validated in S65 before opening the machine 12 to the external network in S66, it is possible to ensure security before the machine 12 is accessed from a terminal which is not permitted to have an access.

Figure 16:
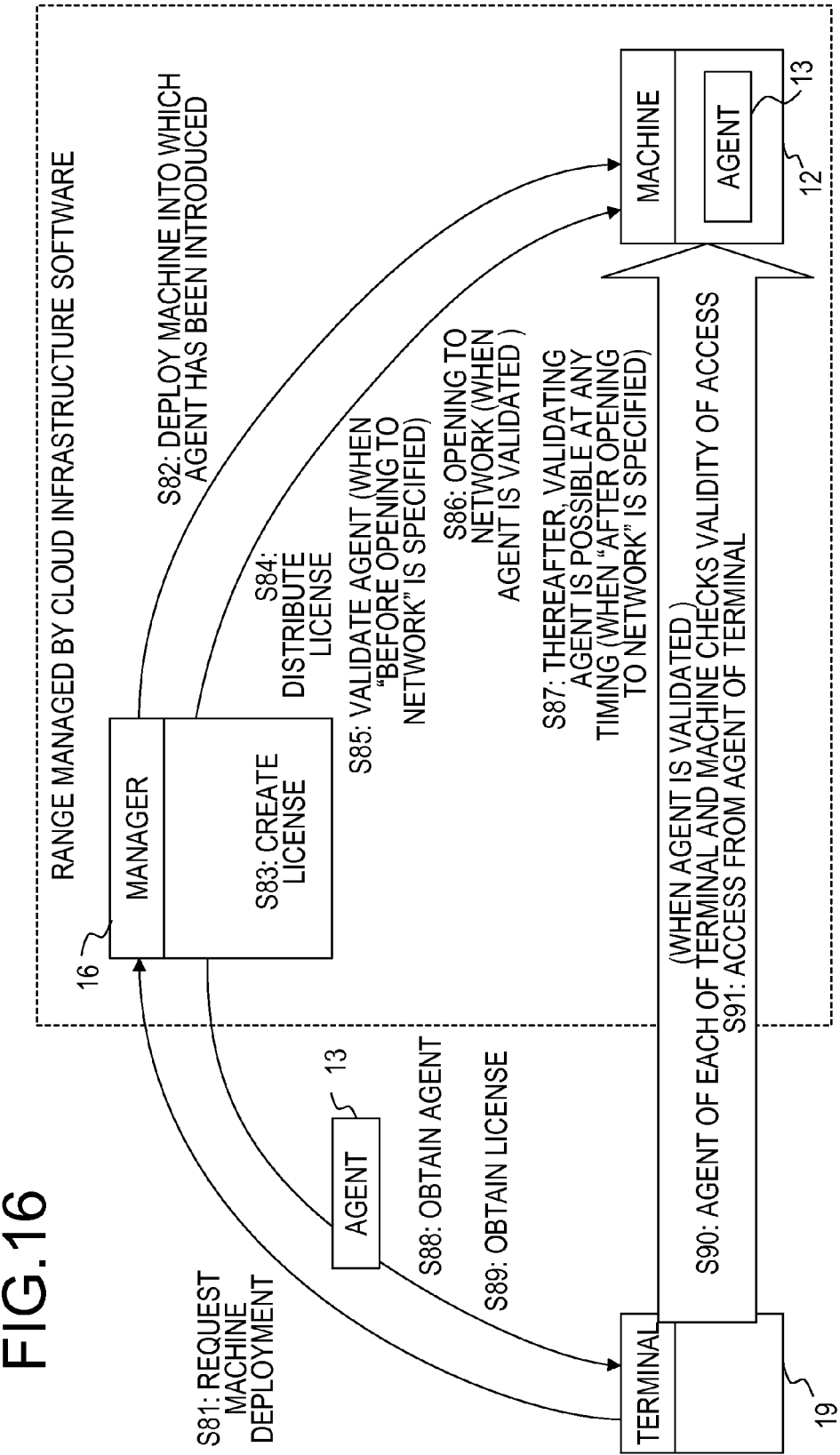
FIG. 16 is a diagram illustrating a case where a machine into which an introduction of an agent has been completed is deployed and a user selects whether to validate the agent in Example_2-2 of the present embodiment.

FIG. 16 is a diagram illustrating a case where a machine into which an introduction of an agent has been completed is deployed and the user selects whether to validate the agent in Example_2-2 of the present embodiment.

The terminal 19 requests the manager 16 to deploy the machine 12 (S81). At this time, it is assumed that the user is able to specify a timing (before or after opening to the network) to validate the agent 13.

The manager 16 deploys the machine 12 into which the agent 13 has been introduced (S82). The manager 16 creates a license by using information on the manager 16, the machine 12, and the terminal 19 (S83). The manager 16 distributes the license to the machine 12 (S84).

If a timing of validating the agent 13 is specified as "before opening to the network" in S81, the manager 16 validates the agent 13 of the machine 12 (S85). The manager 16 allows an access to the machine 12 from the outside via the network by opening the machine 12 to the external network (S86).

If a timing of validating the agent 13 is specified as "after opening to the network" in S81, it is assumed that the user may validate the agent 13 of the machine 12 at any timing later (S87). When validating the agent 13, the terminal 19 requests the manager 16 to validate the agent 13 of the machine 12. Upon receiving the request, the manager 16 validates the agent 13 of the machine 12.

The terminal 19 obtains the agent 13 from the manager 16 (S88). The terminal 19 obtains the license from the manager 16 (S89).

If the agent 13 of the machine 12 is validated, the agent 13 of each of the terminal 19 and the machine 12 checks the validity of the access (S90). If the agent 13 of the machine 12 is not validated, the check on the validity of the access is not performed. If the agent 13 of the machine 12 is validated, the agent 13 of the terminal 19 accesses the machine 12 when the access is permitted (S91). If the agent 13 of the machine 12 is not validated, the terminal 19 accesses the machine 12 by a general access method (such as, for example, SSH).

According to Example_2-2 of the present embodiment, even in a case where a machine 12 into which an introduction of an agent 13 has been completed is deployed and the user selects whether to validate the agent 13, the agent 13 may be validated in S85 before opening the machine 12 to the external network in S86. Therefore, it is possible to ensure security before the machine 12 is accessed from a terminal which is not permitted to have an access.

Figure 17:
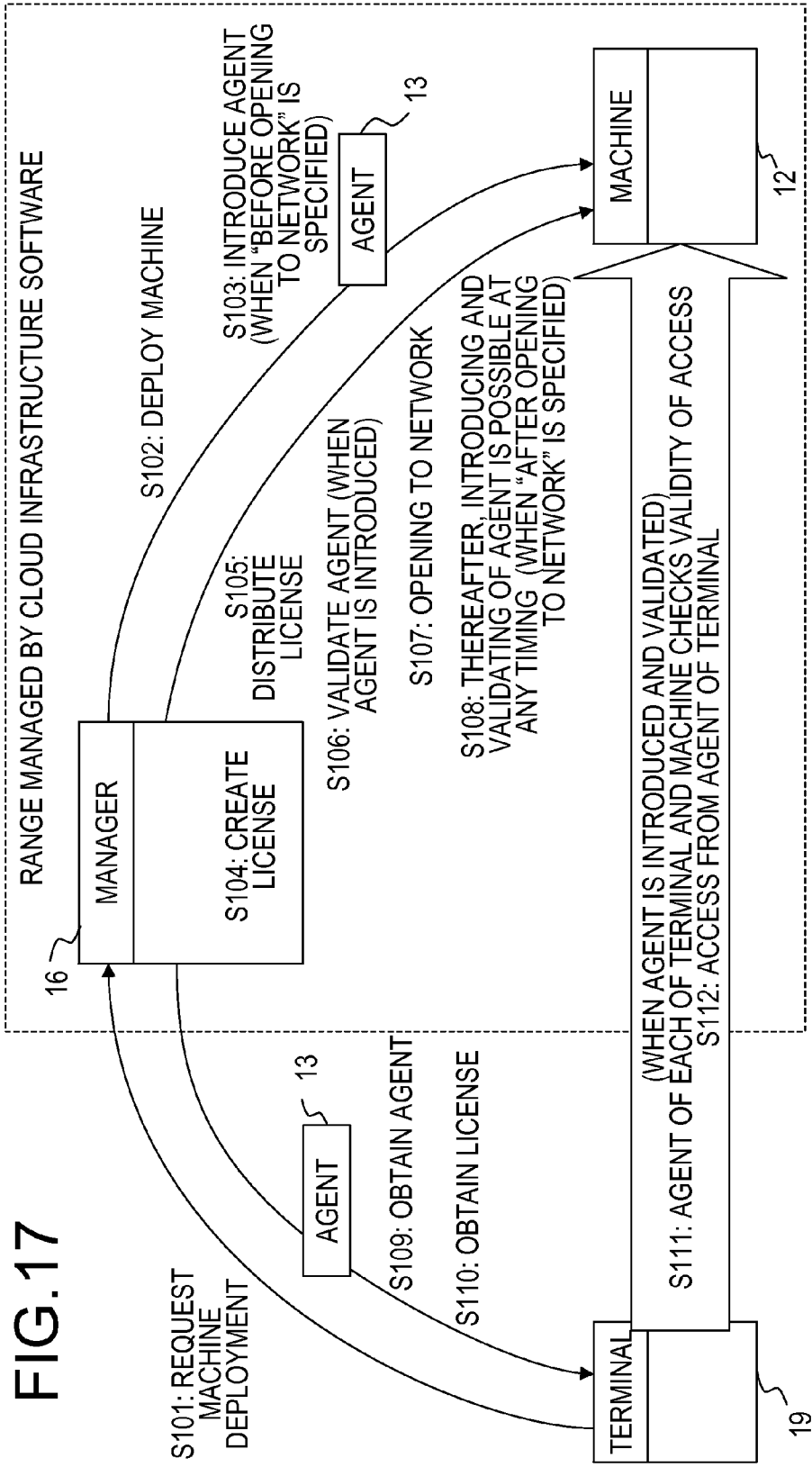
FIG. 17 is a diagram illustrating a case where a machine into which no agent has been introduced is deployed and a user selects a timing of introducing an agent in Example_2-3 of the present embodiment.

FIG. 17 is a diagram illustrating a case where a machine into which no agent has been introduced is deployed and the user selects a timing of introducing an agent in Example_2-3 of the present embodiment.

The terminal 19 requests the manager 16 to deploy the machine 12 (S101). At this time, it is assumed that the user is able to specify a timing (before and after opening to the network) to introduce an agent 13. The manager 16 deploys the machine 12 into which no agent has been introduced (S102).

If a timing of introducing the agent 13 is specified as "before opening to the network" in S101, the manager 16 introduces the agent 13 into the machine 12 (S103). The manager 16 creates a license by using information on the manager 16, the machine 12, and the terminal 19 (S104). The manager 16 distributes the license to the machine 12 (S105).

When the agent 13 has been introduced in S103, the manager 16 validates the agent 13 (S106).

The manager 16 allows an access to the machine 12 from the outside via the network by opening the machine 12 to the external network (S107).

If a timing of introducing the agent 13 is specified as "after opening to the network" in S101, it is assumed that the user may introduce the agent 13 of the machine 12 at any timing later (S108). When introducing the agent 13, the terminal 19 requests the manager 16 to introduce the agent 13 into the machine 12. Upon receiving the request, the manager 16 introduces the agent 13 into the machine 12 and validates the agent 13.

The terminal 19 obtains the agent 13 from the manager 16 (S109). The terminal 19 obtains the license from the manager 16 (S110).

If the agent 13 is introduced into the machine 12 and validated, the agent 13 of each of the terminal 19 and the machine 12 checks the validity of the access (S111). If the agent 13 is not introduced into the machine 12, the check on the validity of the access is not performed. If the agent 13 is introduced into the machine 12 and validated, the agent 13 of the terminal 19 accesses the machine 12 when the access is permitted (S112). If the agent 13 is not introduced into the machine 12, the terminal 19 accesses the machine 12 by a general access method (such as, for example, SSH).

According to Example_2-3 of the present embodiment, even in a case where a machine 12 into which no agent has been introduced is deployed, the agent 13 may be introduced in S103, and the agent 13 may be validated in S106 before opening the machine 12 to the external network in S107. Therefore, it is possible to ensure security before the machine 12 is accessed from a terminal which is not permitted to have an access.

FIG. 18 illustrates an exemplary hardware configuration of a computer (information processing apparatus) which executes a program. A computer 40 functions as the deployment control device 1, the machine 12, the communication control device 15, the management apparatus 16 (manager), or the terminal 19. The computer 40 includes a CPU 42, a read-only memory (ROM) 43, a random access memory (RAM) 46, a communication interface (I/F) 44, a storage unit 47, an output I/F 41, an input I/F 45, a reader 48. These components are connected with each other via a bus 49.

The reader 48 is a device for reading a portable recording medium. The output I/F 41 is connected to an output device 51. The input I/F 45 is connected to an input device 52.

As the storage unit 47, various types of storage devices such as a hard disk, a flash memory, and a magnetic disk may be used. In the storage unit 47 or the ROM 43, a program according to the present embodiment is stored. In the RAM 46, information is temporarily stored.

The CPU 42 reads out the program related to the process of the present embodiment from the storage unit 47 or the ROM 43, and executes the program. For example, when the computer 40 functions as the manager 16, the CPU 42 functions as the receiving unit 2, the generation unit 3, the transmission unit 4, the introduction unit 5, the adding unit 6, the first update control unit 7, the second update control unit 8, and the providing unit 9.

The program for realizing the processing described in the above embodiment may be stored in, for example, the storage unit 47 via the communication I/F 44 and a network 50 from a program provider side. The program for implementing the processing described in the above embodiment may be stored in a portable storage medium that is commercially available. In this case, the portable storage medium may be set in the reader 48, and the program may be read out and executed by the CPU 42. As the portable storage medium, various types of storage media such as a compact disc read-only memory (CD-ROM), a flexible disk, an optical disk, a magneto-optical disk, an integrated circuit (IC) card, and a universal serial bus (USB) memory device may be used. The program stored in the storage medium is read out by the reader 48.

As the input device 52, for example, a keyboard, a mouse, an electronic camera, a web camera, a microphone, a scanner, a sensor, and a tablet may be used. As the output device 51, for example, a display, a printer, and a speaker may be used. The network 50 may be a communications network such as, for example, the Internet, a local area network (LAN), a wide area network (WAN), a dedicated line network, a wired network, and a wireless network.

According to the present embodiment, it is possible to ensure security from the moment the user deploys the machine. It becomes possible to establish the communication from the terminal only for the machine that holds an identical license, and the user may ensure security by himself or herself in a machine operation under the cloud environment.

In the case of performing access control by a communication control device, access permission/denial may be determined by referring to access control settings of the communication control device. In this case, if the number of access increases, the load of referring to the access control settings increases, which results in a bottleneck of communication. In contrast, according to the present embodiment, each agent performs access control, and it is possible to reduce the access control settings. Thus, it is possible to prevent a bottleneck of the communication control device by reducing an increase in load.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment of the present disclosure has been described in detail, it should be understood that the various changes, substitutions, and alterations could be made hereto without departing from the spirit and scope of the disclosure.

What is claimed is:

1. A non-transitory computer-readable recording medium having stored therein a program that causes a computer to execute a process, the process comprising:
   receiving, from a first terminal device, a deployment request for requesting deployment of a virtual machine in a server;
   generating, in response to the received deployment request, the virtual machine configured to
      hold first permission information corresponding to unique information of the first terminal device, the first permission information being used to permit communication between the server and the first terminal device, the first permission information including at least one of a communication port number used by the first terminal device and a communication protocol used by the first terminal device, and
      selectively allow an access from a second terminal device having second permission information that is identical to the first permission information;
   transmitting the first permission information to the first terminal device;
   introducing an agent into the virtual machine if it is specified, in the deployment request, to introduce the agent before validating a communication function of the virtual machine;
   providing the first permission information to the virtual machine; and
   validating the communication function of the virtual machine after validating the agent.

2. The non-transitory computer-readable recording medium according to claim 1, wherein
   the agent selectively allows the access from the second terminal device having the second permission information that is identical to the first permission information.

3. The non-transitory computer-readable recording medium according to claim 1, the process further comprising:
   receiving, from the first terminal device to which the first permission information is transmitted, an issuance request for requesting issuance of the second permission information for the second terminal device;
   generating the second permission information in response to the issuance request, the second permission information being obtained by adding permission information corresponding to unique information of the second terminal device to the first permission information;
   providing the second permission information to the virtual machine to update the first permission information held by the virtual machine to the second permission information;
   providing, in response to a request from the first terminal device, the second permission information to the first terminal device to update the first permission information held by the first terminal device to the second permission information; and
   providing, in response to a request from the second terminal device, the second permission information to the second terminal device.

4. A deployment control device, comprising:
   a processor configured to
   receive, from a first terminal device, a deployment request for requesting deployment of a virtual machine in a server;
   generate, in response to the received deployment request, the virtual machine configured to
      hold first permission information corresponding to unique information of the first terminal device, the first permission information being used to permit communication between the server and the first terminal device, the first permission information including at least one of a communication port number used by the first terminal device and a communication protocol used by the first terminal device, and
      selectively allow an access from a second terminal device having second permission information that is identical to the first permission information;
   transmit the first permission information to the first terminal device;
   introduce an agent into the virtual machine if it is specified, in the deployment request, to introduce the agent before validating a communication function of the virtual machine;
   provide the first permission information to the virtual machine; and
   validate the communication function of the virtual machine after validating the agent.

5. A deployment control method, comprising:
   receiving by a computer, from a first terminal device, a deployment request for requesting deployment of a virtual machine in a server;
   generating, in response to the received deployment request, the virtual machine configured to
      hold first permission information corresponding to unique information of the first terminal device, the first permission information being used to permit communication between the server and the first terminal device, the first permission information including at least one of a communication port number used by the first terminal device and a communication protocol used by the first terminal device, and selectively allow an access from a second terminal device having second permission information that is identical to the first permission information;

transmitting the first permission information to the first terminal device;

introducing an agent into the virtual machine if it is specified, in the deployment request, to introduce the agent before validating a communication function of the virtual machine;

providing the first permission information to the virtual machine; and validating the communication function of the virtual machine after validating the agent.

\* \* \* \* \*